(12) United States Patent
Nishiura

(10) Patent No.: US 11,388,478 B2
(45) Date of Patent: Jul. 12, 2022

(54) DISPLAY APPARATUS, CONTENT DISPLAYING METHOD, AND NON-TRANSITORY RECORDING MEDIUM

(71) Applicant: Sharp Kabushiki Kaisha, Sakai (JP)

(72) Inventor: Kazuo Nishiura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/876,193

(22) Filed: May 18, 2020

(65) Prior Publication Data

US 2020/0351554 A1 Nov. 5, 2020

Related U.S. Application Data

(63) Continuation of application No. 15/921,709, filed on Mar. 15, 2018, now Pat. No. 10,701,445.

(30) Foreign Application Priority Data

Mar. 27, 2017 (JP) .............................. JP2017-060711

(51) Int. Cl.
| | | |
|---|---|---|
| *H04N 21/458* | (2011.01) | |
| *H04N 21/435* | (2011.01) | |
| *H04N 21/414* | (2011.01) | |
| *H04N 21/6547* | (2011.01) | |
| *H04N 21/81* | (2011.01) | |

(52) U.S. Cl.
CPC ... *H04N 21/4586* (2013.01); *H04N 21/41415* (2013.01); *H04N 21/435* (2013.01); *H04N 21/6547* (2013.01); *H04N 21/812* (2013.01)

(58) Field of Classification Search
CPC ....................... H04N 21/4586; H04N 21/435
See application file for complete search history.

(56) References Cited

U.S. PATENT DOCUMENTS

| | | | |
|---|---|---|---|
| 2009/0179733 A1 | 7/2009 | Hattori et al. | |
| 2010/0269128 A1* | 10/2010 | Gordon ................ | H04N 21/442 725/25 |
| 2010/0333137 A1* | 12/2010 | Hamano ............ | H04N 7/17318 725/39 |
| 2015/0169557 A1* | 6/2015 | Ciordas .............. | H04N 21/4826 707/609 |

FOREIGN PATENT DOCUMENTS

CN 101243467 A 8/2008

OTHER PUBLICATIONS

Nishiura, "Display Apparatus, Content Displaying Method, and Non-Transitory Recording Medium", U.S. Appl. No. 15/921,709, filed Mar. 15, 2018.

* cited by examiner

*Primary Examiner* — Chenea Davis

(74) *Attorney, Agent, or Firm* — Keating & Bennett, LLP

(57) ABSTRACT

A display apparatus includes a display controller that displays, on the basis of a display schedule, content included in distribution data distributed from a content distribution apparatus. The display apparatus determines whether or not content that matches the replacement rule is included in the distribution data. When displaying content included in the distribution data on the basis of the display schedule, if it is determined that content that matches the replacement rule is included in the distribution data, the display apparatus replaces the content with the replacement content and displays the replacement content.

7 Claims, 18 Drawing Sheets

FIG. 3A

```
*Schedule_1
2017/04/01, TimeTable_1
2017/04/02, TimeTable_1
2017/04/03, TimeTable_2
2017/04/04, TimeTable_1
```

FIG. 3B

```
*TimeTable_1
09:00:00, 12:00:00, Program_1
12:00:00, 13:00:00, Program_2
13:00:00, 17:00:00, Program_1
```

FIG. 3C

```
*Program_1
00:00:10, Picture1.jpg
00:00:10, Picture2.jpg
00:00:10, Picture3.jpg
00:02:00, Movie1.mp4
```

FIG. 3D

```
Picture1.jpg
Picture2.jpg
Picture3.jpg
Movie1.mp4
Telop.tlp
```

FIG. 15B

```
*Program_1
*Frame_1, 0, 0, 1000, 800
00:00:10, Picture1.jpg
00:00:10, Picture2.jpg
00:00:10, Picture3.jpg
00:02:00, Movie1.mp4
*Frame_2, 1000, 0, 1920, 400
00:00:30, Picture4.htm
00:00:30, Picture5.htm
*Frame_3, 1000, 400, 1920, 800
00:05:00, Movie2.mp4
*Frame_4, 0, 800, 1920, 280
00:01:00, Telop.tlp
```

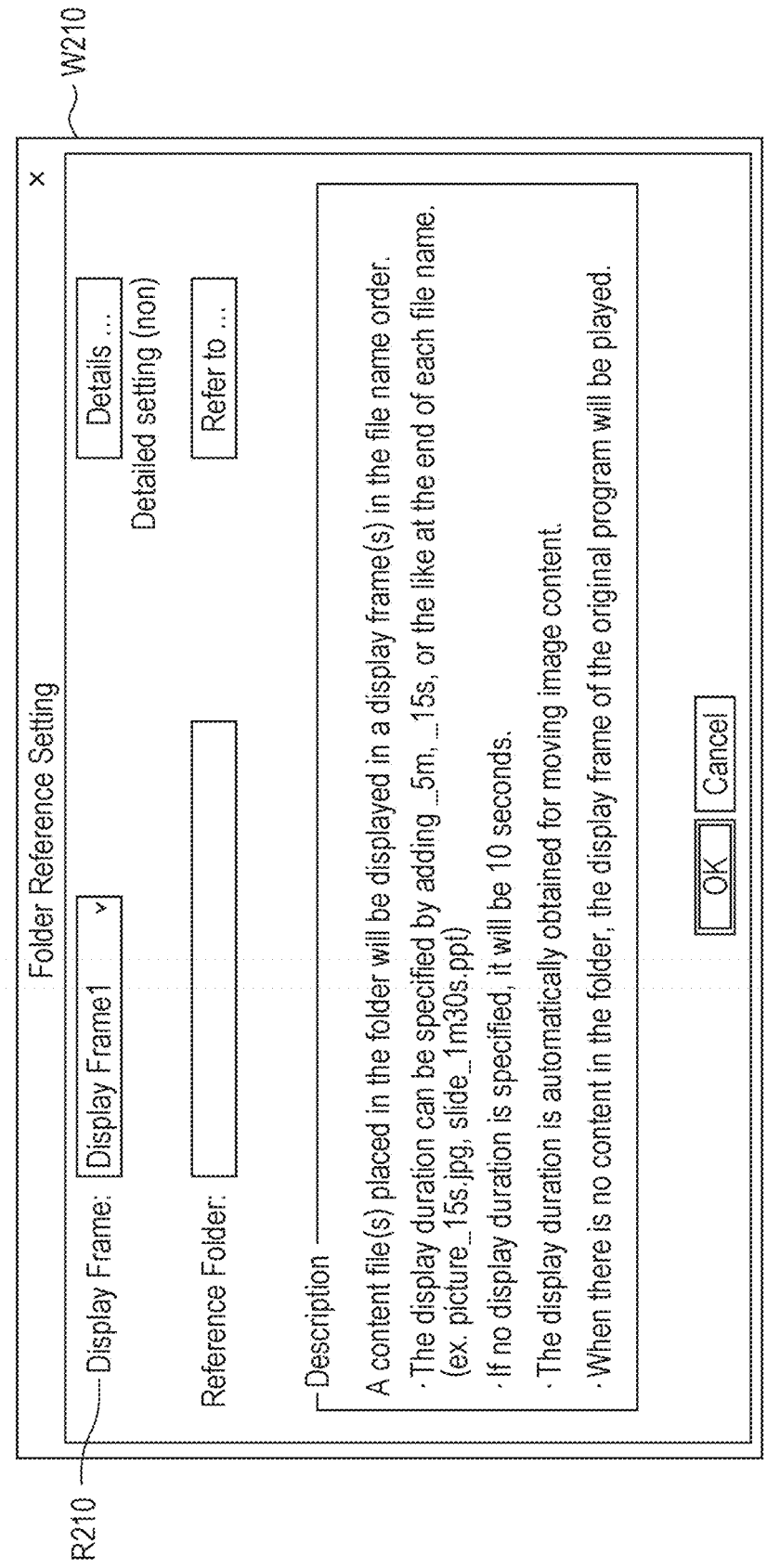

DISPLAY APPARATUS, CONTENT DISPLAYING METHOD, AND NON-TRANSITORY RECORDING MEDIUM

BACKGROUND

1. Field

The present disclosure relates to a display apparatus including a display controller that displays, on the basis of a display schedule, content included in distribution data distributed from a content distribution apparatus.

2. Description of the Related Art

The following mechanism (digital signage) has been used at places such as outdoors, stores, shopping malls, event halls, amusement facilities, and public institutions to transmit information such as advertisements, sales promotion/space production, and various guides using electronic display apparatuses such as displays.

In such digital signage, generally content (a signage program) that has been created and edited by a content distribution side is uniformly received and displayed.

However, there are needs for displaying different items of content depending on, for example, the locations of display apparatuses. To this end, for example, Japanese Unexamined Patent Application Publication No. 2006-40180 discloses an information distribution system using vending machines in order to provide information (local information) that suits the locations. The system creates an integrated schedule by adjusting a nationwide broadcast schedule and a local broadcast schedule, and, on the basis of the integrated schedule and a priority level (nationwide broadcasting is given priority), broadcasts programs selected from the nationwide broadcast and the local broadcast.

However, because content to play (signage program) is generally created by the content distribution side and distributed to and displayed at the content display side, it is not easy to partially replace a program that has already been distributed and to play the partially-replaced program according to the circumstances of the content display side.

When there are only a few display apparatuses at the display distribution side and when these display apparatuses all display the same signage program, the content distribution side may re-create a signage program and re-distribute the program. However, in the case of distribution from the headquarter to branches nationwide, if there are requests from the individual branches to partially replace the program, it takes much labor to re-create and re-distribute the signage program.

When the content distribution side is to create signage programs, if there are many distribution destinations and if different programs are to be displayed at the individual distribution destinations, it may be necessary to create signage programs for the individual distribution destinations, which is not easy to do.

For example, when a branch serving as the content display side wants to display original content (signage program), the branch once uploads the branch's original content to the headquarter serving as the content distribution side. Using the uploaded content, the content distribution side creates the branch's original signage program. Then, the content distribution side re-distributes the created signage program to the branch.

SUMMARY

It is desirable to provide a display apparatus capable of easily replacing a program on the display apparatus side in the case of displaying content distributed from a content distribution apparatus.

According to an aspect of the disclosure, there is provided a display apparatus including a display controller that displays, on the basis of a display schedule, content included in distribution data distributed from a content distribution apparatus, including: a replacement rule storage unit that stores a replacement rule that is information regarding replacement content replacing to-be-displayed content; and a determination unit that determines whether or not content that matches the replacement rule is included in the distribution data. When displaying content included in the distribution data on the basis of the display schedule, if the determination unit determines that content that matches the replacement rule is included in the distribution data, the display controller replaces the content with the replacement content and displays the replacement content.

According to an aspect of the disclosure, there is provided a content displaying method including displaying, on the basis of a display schedule, content included in distribution data distributed from a content distribution apparatus, including: storing a replacement rule that is information regarding replacement content replacing to-be-displayed content; and determining whether or not content that matches the replacement rule is included in the distribution data. When displaying content included in the distribution data on the basis of the display schedule, if it is determined in the determining that content that matches the replacement rule is included in the distribution data, the content is replaced with the replacement content and the replacement content is displayed in the displaying.

According to another aspect of the disclosure, there is provided a non-transitory recording medium storing a program for causing a computer mounted on a display apparatus that displays, on the basis of a display schedule, content included in distribution data distributed from a content distribution apparatus, to execute a process including: storing a replacement rule that is information regarding replacement content replacing to-be-displayed content; and determining whether or not content that matches the replacement rule is included in the distribution data. When displaying content included in the distribution data on the basis of the display schedule, if it is determined in the determining that content that matches the replacement rule is included in the distribution data, the content is replaced with the replacement content and the replacement content is displayed.

BRIEF DESCRIPTION OF THE DRAWINGS

FIGS. 3A to 3D are schematic diagrams for describing distribution data according to the first embodiment;

FIG. 15B is a diagram for describing distribution data according to the second embodiment;

FIG. 16 illustrates an exemplary screen for describing a replacement rule setting process according to the second embodiment;

DESCRIPTION OF THE EMBODIMENTS

Hereinafter, embodiments of the present disclosure will be described with reference to the drawings. In the embodiments, the case of applying the present disclosure to, as an example of a display apparatus, a large display apparatus, such as a display apparatus used in digital signage, capable of displaying content will be described.

1. FIRST EMBODIMENT 1.1 Overall Configuration

Figure 1:
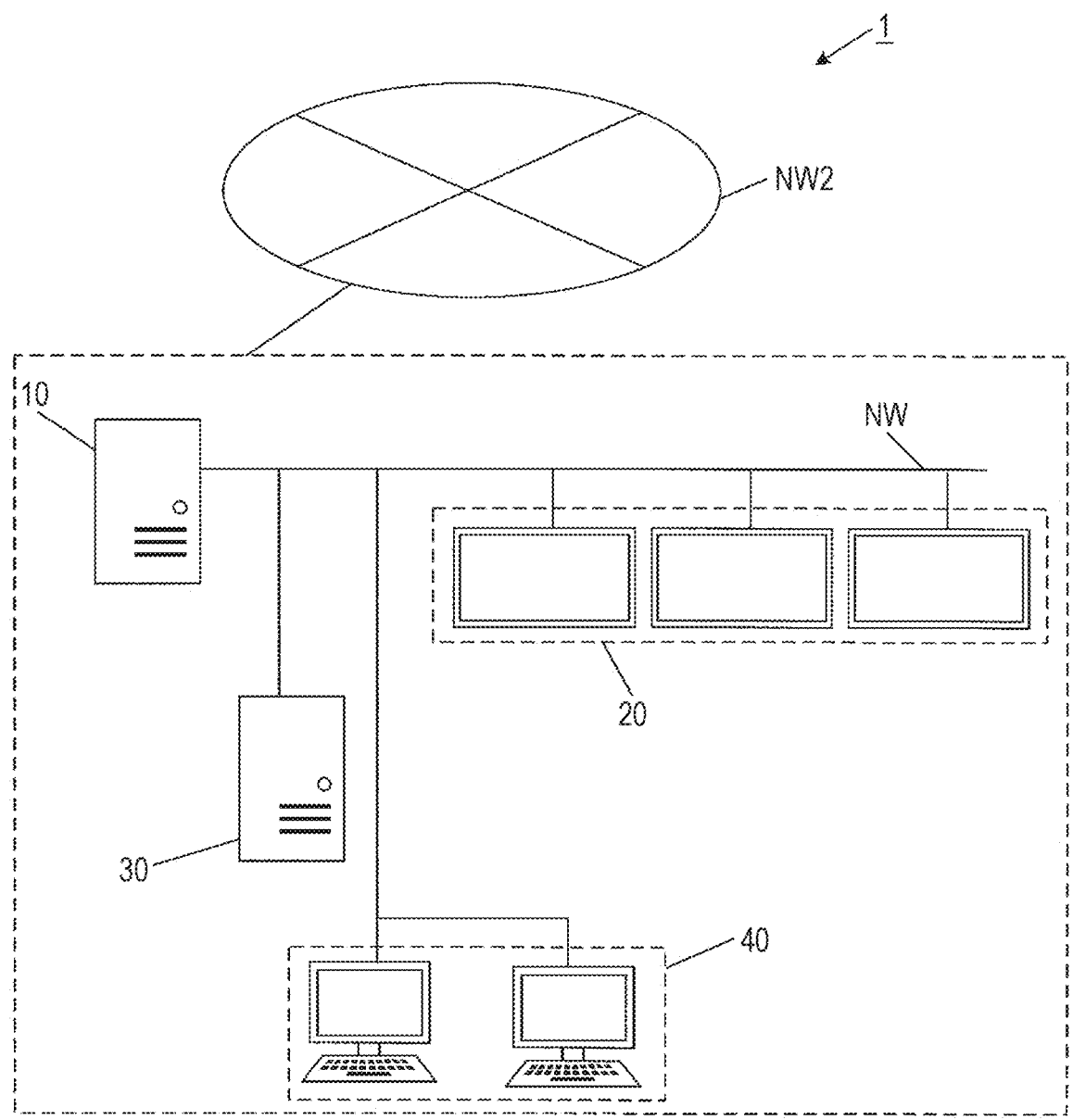
FIG. 1 is a diagram for describing the overall system according to a first embodiment.

FIG. 1 is a diagram for describing the entirety of a content distribution system 1. In the content distribution system 1, one or more display apparatuses 20 are connected to a content distribution apparatus 10 (content distribution server) via a network NW.

In addition, a shared file server 30, and one or more terminal apparatuses 40 are connected to the network NW. For the convenience of description, the shared file server 30 and the terminal apparatuses 40 are connected to the network NW; however, the shared file server 30 and the terminal apparatuses 40 may be connected via an external network NW2. An example of the external network NW2 includes the Internet.

Each display apparatus 20 is a display apparatus capable of displaying content included in a program distributed from the content distribution apparatus 10, and includes, for example, a liquid crystal display (LCD), an organic electroluminescence (EL) display, or a light-emitting diode (LED) display.

The content distribution apparatus 10 is an apparatus for managing one or more display apparatuses 20. For example, a content provider, an information provider, or an advertisement distributor registers content (program) in the content distribution apparatus 10. The registered program is distributed to each display apparatus 20 on the basis of a schedule set in the content distribution apparatus 10.

Here, the term "content" in the present embodiment may include any of a still image, a moving image, audio, and text. Content includes one or more files, and a plurality of files may be configured in folder units (directory units). A plurality of files may be collectively stored in one file (for example, may be archived in the ZIP file format or the CAB file format).

Here, a file included in content is referred to as a file of content (content file). In addition, to-be-distributed content may be content registered (stored) in the content distribution apparatus 10 or may be stored in an external server.

Each terminal apparatus 40 is an apparatus used by a user and is an information processing apparatus such as a computer, a tablet, or a smartphone. Using the terminal apparatus 40, the user can register replacement content, which is content for replacing distributed content. Replacement content may be stored directly in each display apparatus 20 or may be stored in the shared file server 30. For example, when there is a plurality of display apparatuses 20, if replacement content is stored in and managed by the shared file server 30, content can be collectively replaced.

The shared file server 30 is conceivable as, for example, a server apparatus that realizes Network-attached Storage (NAS) connected to a network, and a file sharing function. The method for sharing files may use, for example, file sharing services such as Server Message Block (SMB), Common Internet File System (CIFS), Apple Filing Protocol (AFP), and Network File System (NFS), or file transfer services such as File Transfer Protocol (FTP). In addition, file sharing may be performed using an area in a storage device included in or attached to each display apparatus 20 and/or terminal apparatus 40.

1.2 Functional Configuration

Next, the functional configuration of each apparatus included in the content distribution system 1 will be described using the drawings. Note that each terminal apparatus 40 is an information processing apparatus such as a normal computer or a tablet, and shared files may be stored in the terminal apparatus 40. Therefore, the terminal apparatus 40 will be described together with the shared file server 30.

1.2.1 Content Distribution Apparatus

Figure 2:
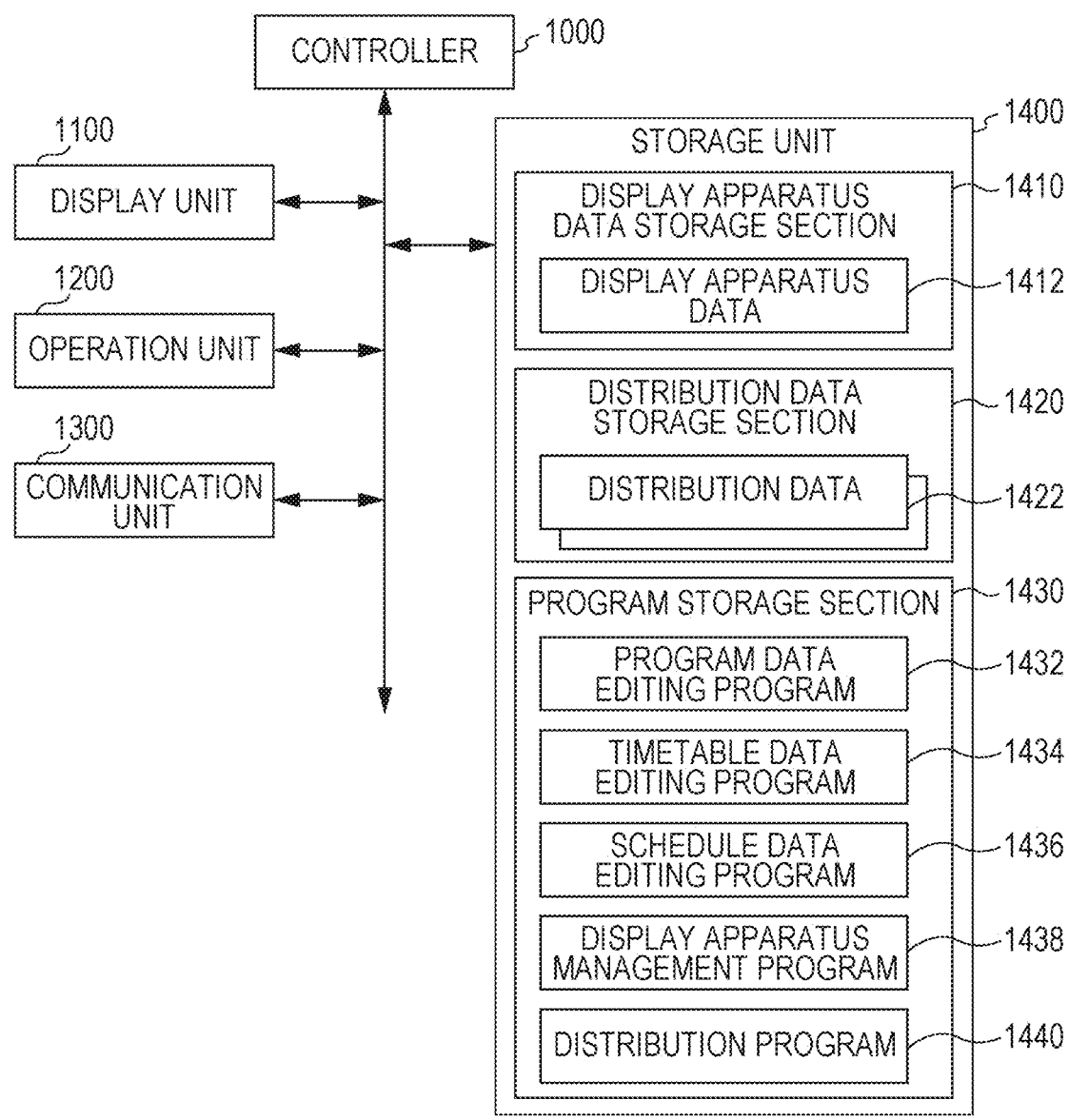
FIG. 2 is a diagram for describing the functional configuration of a content distribution apparatus according to the first embodiment.

The functional configuration of the content distribution apparatus 10 according to the present embodiment will be described on the basis of FIG. 2. The functional configuration of the content distribution apparatus 10 includes, as illustrated in FIG. 2, a controller 1000, a display unit 1100, an operation unit 1200, a communication unit 1300, and a storage unit 1400.

The controller 1000 is a function unit for controlling the entire content distribution apparatus 10. The controller 1000 realizes various functions by reading and executing various programs stored in the storage unit 1400, and includes, for example, a central processing unit (CPU).

The display unit 1100 is a function unit (device) capable of displaying information such as various images and text. The display unit 1100 includes, for example, an LCD or an organic EL display. The display unit 1100 may be any device as long as it is a general display device.

The operation unit 1200 is a function unit capable of inputting and receiving various operations, and includes, for example, a keyboard, a mouse, and a touchscreen. For example, the administrator performs various operations (such as registration, editing, and deletion of distribution data) using the operation unit 1200.

The communication unit 1300 is a function unit for connecting to a network. Examples of the communication unit 1300 include a wired local area network (LAN), a wireless LAN, and an interface capable of connecting to Long-Term Evolution (LTE) networks. When connected to such a network, the communication unit 1300 is connected to another apparatus or network and becomes able to communicate with the other apparatus or network.

The storage unit 1400 is a function unit that stores various programs and various items of data for the operation of the content distribution apparatus 10. The storage unit 1400 includes, for example, a solid-state drive (SSD) which is semiconductor memory, or a hard disk drive (HDD) which is a magnetic disk. Alternatively, for example, universal serial bus (USB) memory or a memory card may be used as the storage unit 1400.

The storage unit 1400 includes storage areas, namely, a display apparatus data storage section 1410 for storing display apparatus data 1412 which is information regarding each display apparatus 20, a distribution data storage section 1420 for storing distribution data 1422, and a program storage section 1430 for storing various programs.

The display apparatus data 1412 is information regarding each display apparatus 20 to which the content distribution apparatus 10 distributes content. Information regarding each display apparatus 20 is stored, examples of which include the performance (e.g., display resolution, and vertical or landscape orientation), location, network address (e.g., Internet Protocol (IP) address and media access control (MAC) address), and device in cooperation.

The distribution data 1422 stored in the distribution data storage section 1420 includes a program (content) distributed to each display apparatus 20, and one or more items of distribution data 1422 are stored. Here, an example of the distribution data 1422 will be described using FIGS. 3A to 3D.

Distribution data in the present embodiment includes, as elements, schedule data (FIG. 3A), timetable data (FIG. 3B), program data (FIG. 3C), and a content file(s) (FIG. 3D).

In the schedule data, a display date and a timetable are stored in association with a schedule name (such as "Schedule_1").

In the timetable data, a display duration slot (start time and end time) and the program name of corresponding program data are stored in association with a time table name (such as "TimeTable_1").

In the program data, a playlist of to-be-displayed content (time and content name) is stored in association with a program name (such as "Program_1").

In the content, the actual data file such as a still image or a moving image is stored. A file included in the content is displayed on the display apparatus 20 on the basis of the schedule data, the timetable data, and the program data.

In the program storage section 1430, a program data editing program 1432, a timetable data editing program 1434, a schedule data editing program 1436, a display apparatus management program 1438, and a distribution program 1440 are stored as the need arises. Each program is read and executed by the controller 1000, thereby realizing each function.

Figure 4:
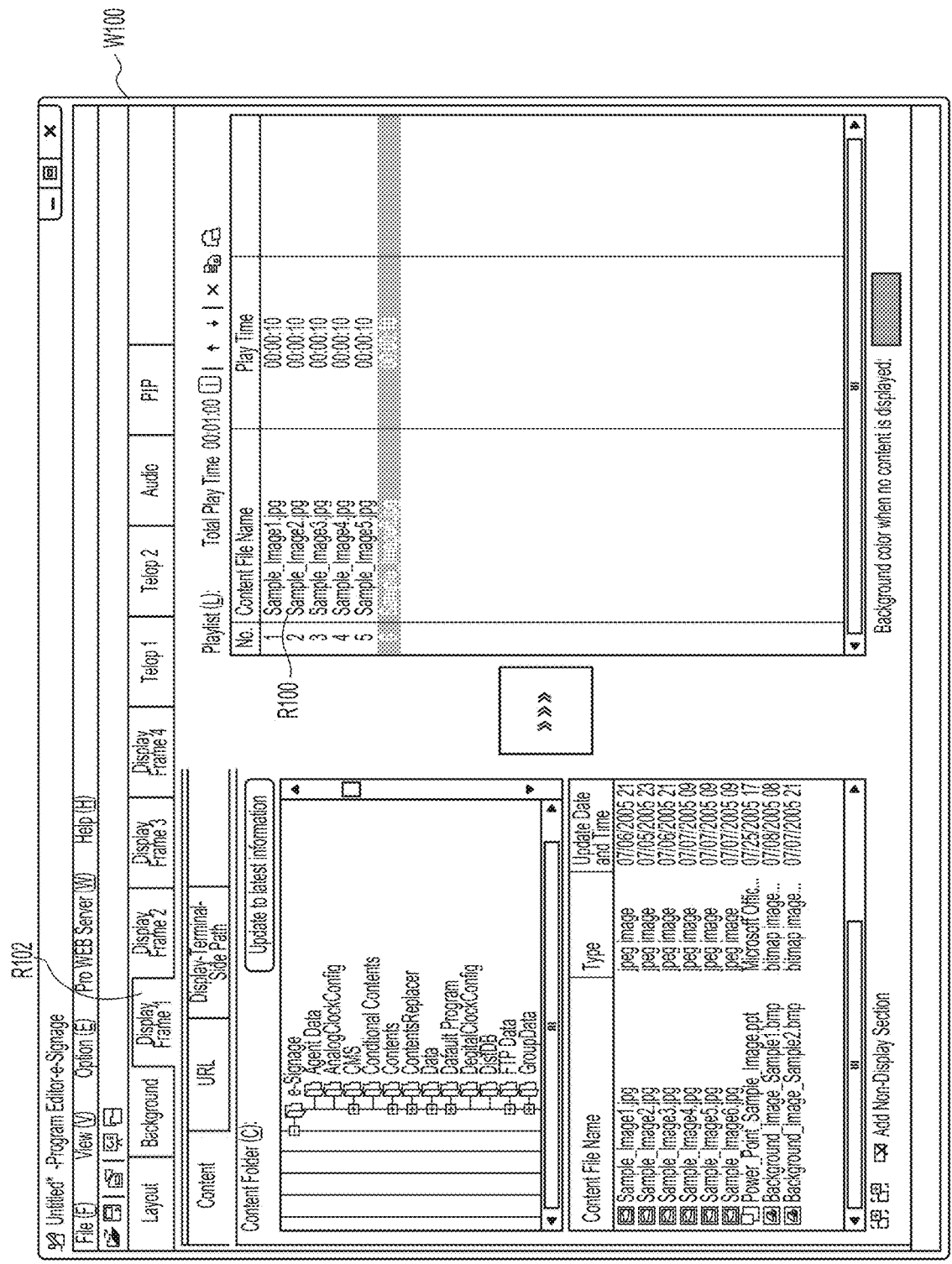
FIG. 4 is a diagram for describing an example of a playlist edit screen according to the first embodiment.

The program data editing program 1432 is a program capable of creating and editing program data based on a playlist by specifying one or more items of content. Here, an example of an execution screen in the case of executing the program data editing program 1432 is illustrated as a display screen W100 in FIG. 4. Note that the display screen W100 may be displayed on the entire display area of the display apparatus 20 (one screen display) or may be displayed as a window (multi-display).

A playlist is displayed in a region R100, which is a region on the right side, of the display screen W100. As indicated in the region R100, a playlist can be generated by selecting one or more items of content. In addition, content can be changed or deleted by selecting one or more items of content included in the playlist on the screen. Although a region R102 includes the description of a display frame, this point will be described in another embodiment.

Figure 5:
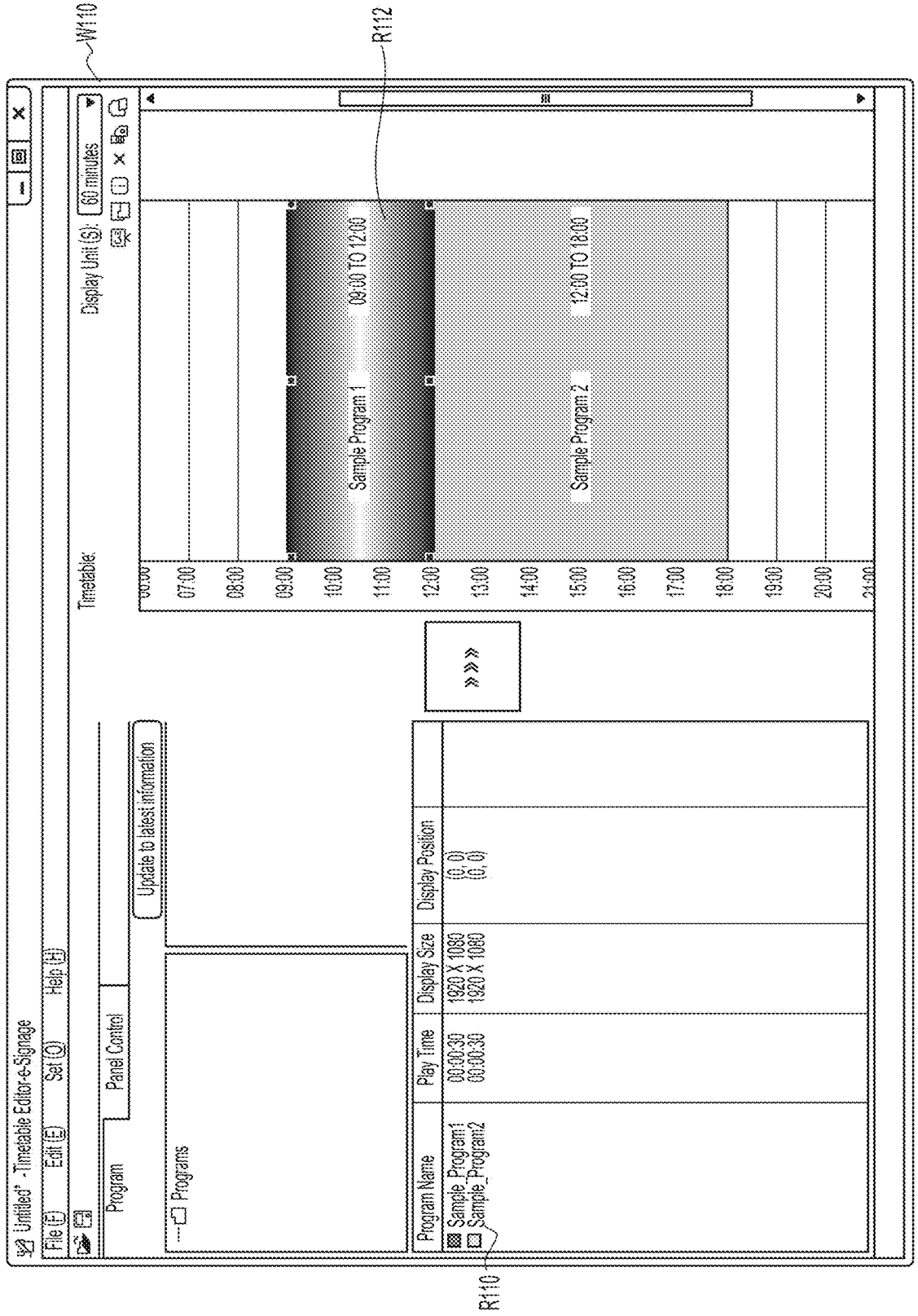
FIG. 5 is a diagram for describing an example of a timetable edit screen according to the first embodiment.

The timetable data editing program 1434 is a program capable of creating and editing timetable data by specifying one or more items of program data. Here, an example of an execution screen in the case of executing the timetable data editing program 1434 is illustrated as a display screen W110 in FIG. 5.

Selectable program names are displayed in a region R110 of the display screen W110. By selecting one or more items of program data from among these selectable program names, a timetable can be created. The created timetable is displayed in a region R112 on the right side of the display screen W110. The timetable to display may be displayed as graphics as in FIG. 5 or may be displayed as a list using text.

Figure 6:
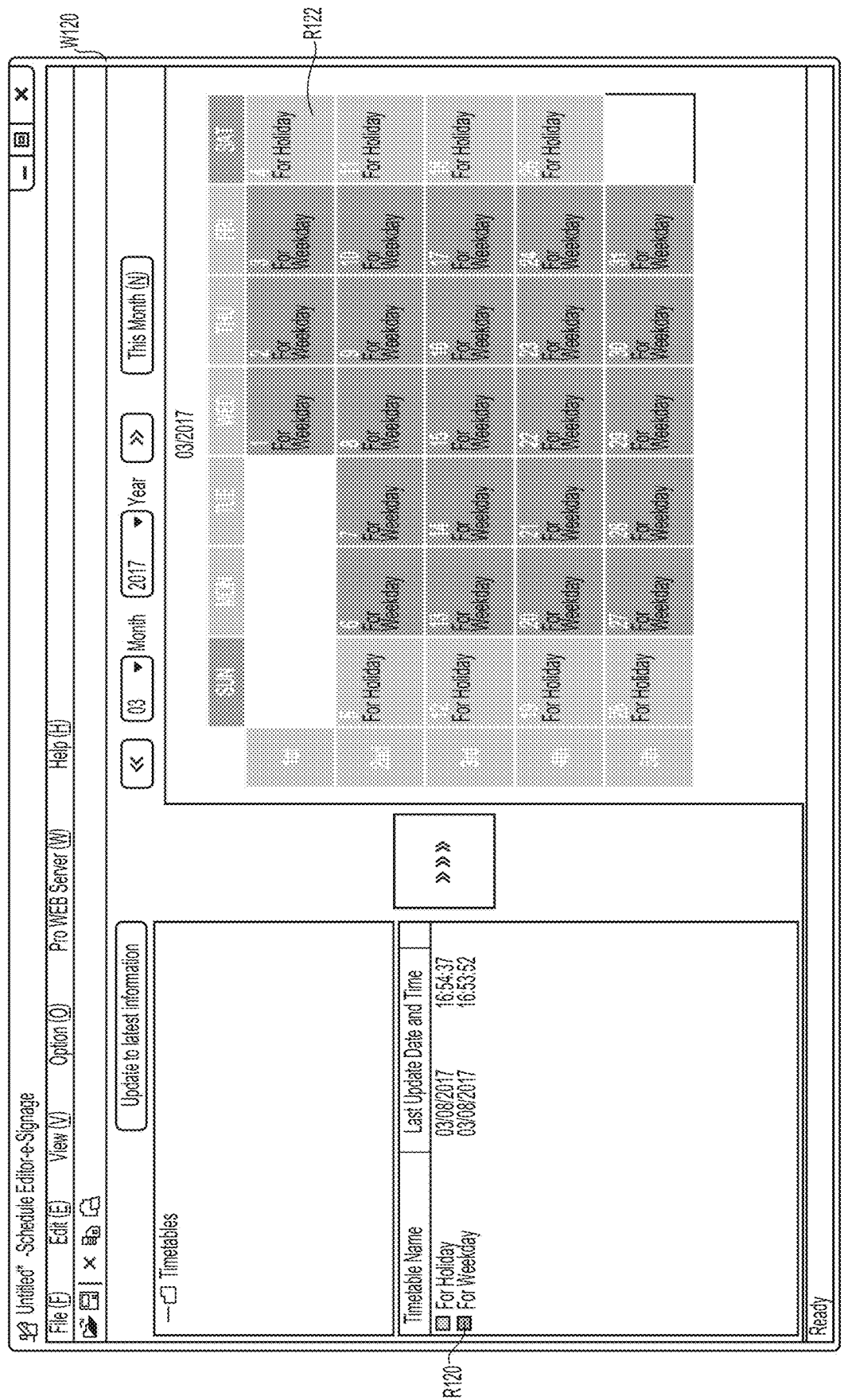
FIG. 6 is a diagram for describing an example of a schedule edit screen according to the first embodiment.

The schedule data editing program 1436 is a program capable of creating and editing schedule data by specifying one or more items of timetable data. Here, an example of an execution screen in the case of executing the schedule data editing program 1436 is illustrated as a display screen W120 in FIG. 6.

Selectable timetable names are displayed in a region R120 of the display screen W120. By selecting one or more items of timetable data from among these selectable timetable names, schedule data can be created. The created schedule data is displayed in a region R122 on the right side of the display screen W120. The schedule data to display may be displayed as graphics as in FIG. 6 or may be displayed as a list using text.

In this manner, the created program data, timetable data, schedule data, and content (file(s)) are stored and managed as the distribution data 1422.

The display apparatus management program 1438 is a program for managing each display apparatus 20 to which the distribution data 1422 is distributed. To which display apparatus 20 the distribution data 1422 will be distributed can be selected and determined by the administrator through execution of the display apparatus management program 1438.

With the distribution program 1440, the distribution data 1422 is distributed to the selected display apparatus 20. Here, the timing for distributing the distribution data 1422 to the selected display apparatus 20 is certain timing, such as once a day (in the morning). Note that the number of times the distribution data 1422 is distributed may be once or multiple times. Although the description assumes that items of distribution data 1422 are collectively distributed, items of distribution data 1422 may be distributed as occasion demands.

1.2.2 Display Apparatus

Figure 7:
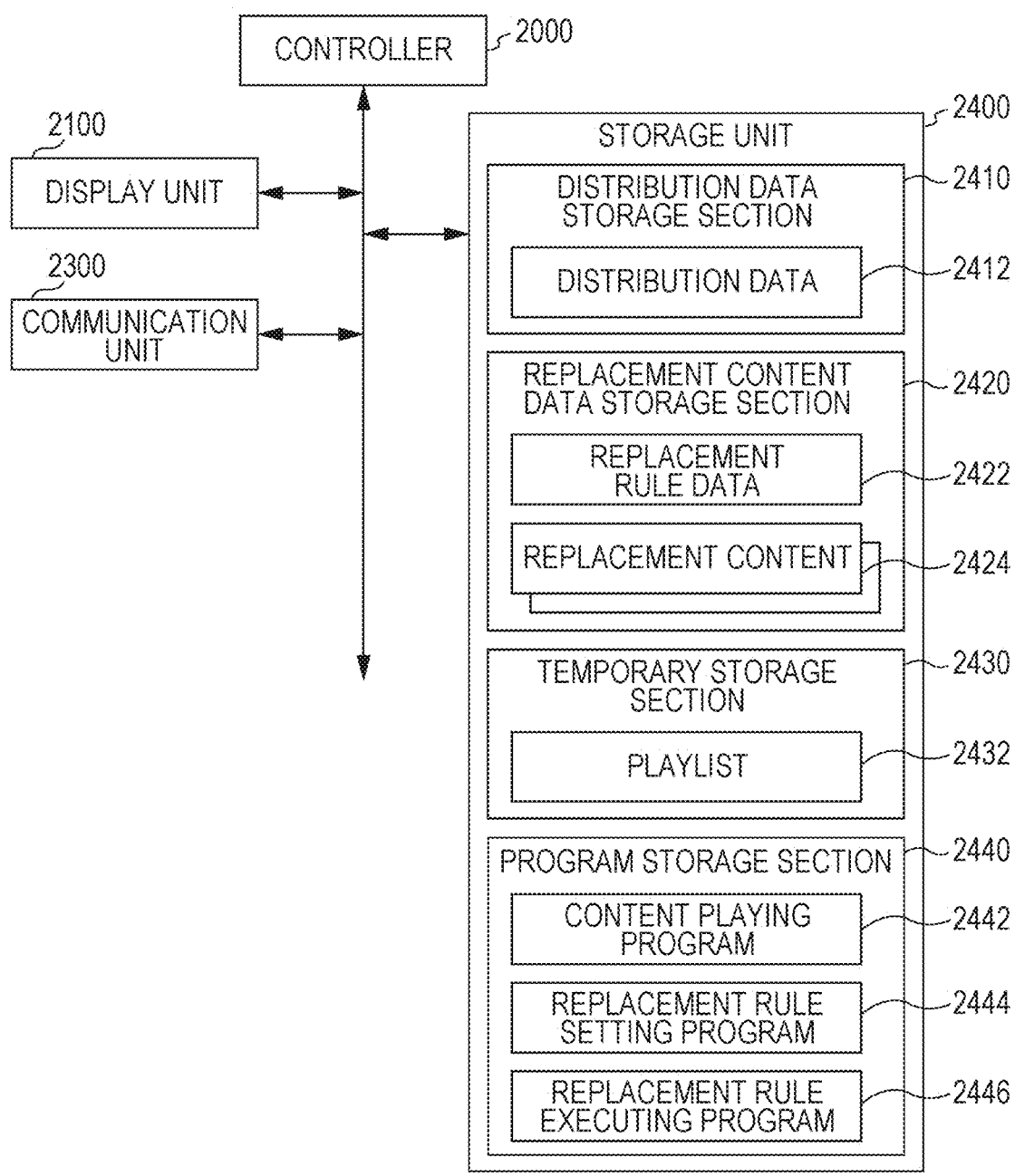
FIG. 7 is a diagram for describing the functional configuration of a display apparatus according to the first embodiment.

The functional configuration of each display apparatus 20 according to the present embodiment will be described on the basis of FIG. 7. The functional configuration of the display apparatus 20 includes, as illustrated in FIG. 7, a controller 2000, a display unit 2100, a communication unit 2300, and a storage unit 2400.

The controller 2000 is a function unit for controlling the entire display apparatus 20. The controller 2000 realizes various functions by reading and executing various programs stored in the storage unit 2400, and includes, for example, a CPU.

The display unit 2100 is a function unit (device) capable of displaying information such as various images and text and is a function unit for displaying content (such as a still image, a moving image, and text). The display unit 2100 includes, for example, an LCD or an organic EL display. Alternatively, content may be displayed (projected) by a projector or the like, or the display unit 2100 may be an external display device connected by High-Definition Multimedia Interface (HDMI) (registered trademark), Digital Visual Interface (DVI), or the like.

The communication unit 2300 is a function unit for connecting to a network. Examples of the communication unit 2300 include a wired LAN, a wireless LAN, and an interface capable of connecting to LTE networks. When connected to such a network, the communication unit 2300 is connected to another apparatus or network and becomes able to communicate with the other apparatus or network.

The storage unit 2400 is a function unit that stores various programs and various items of data for the operation of the display apparatus 20. The storage unit 2400 includes, for example, an SSD which is semiconductor memory, or an HDD which is a magnetic disk. Alternatively, for example, USB memory or a memory card may be used as the storage unit 2400.

The storage unit 2400 includes storage areas, namely, a distribution data storage section 2410 for storing distribution data 2412, a replacement content data storage section 2420, a temporary storage section 2430, and a program storage section 2440 for storing various programs.

The distribution data 2412 stored in the distribution data storage section 2410 is a program (content) distributed from the content distribution apparatus 10. The distribution data 2412 has the same configuration as that of the distribution data 1422 illustrated in FIGS. 3A to 3D, and a description thereof is omitted.

In the replacement content data storage section 2420, replacement rule data 2422 setting a rule for replacing distribution data, and replacement content 2424, which is the actual replacement content, are stored. One or more replacement rules can be set in the replacement rule data 2422. In addition, one or more files of replacement content are stored in the replacement content 2424.

Here, the replacement content 2424 may be stored in the display apparatus 20, or, as will be described later, may be stored in another apparatus. When the replacement content 2424 is stored in another apparatus, only the replacement rule data 2422 is stored in the display apparatus 20.

A playlist 2432 is stored in the temporary storage section 2430. The playlist 2432 is generated by replacing distribution data in accordance with a replacement rule and is used for the display apparatus 20 to display and play content.

For the convenience of description, although it has been described that a program/content is displayed (played) by executing a content playing program 2442 on the basis of the playlist 2432, a program may be displayed on the basis of the distribution data 2412 if no replacement is particularly performed. In addition, for example, display based on the distribution data 2412 may be performed without temporarily creating the playlist 2432, and, as the need arises, the distribution data 2412 may be replaced with replacement content in accordance with a replacement rule and the replacement content may be displayed.

Although it has been described that the playlist 2432 is stored in the temporary storage section 2430, the playlist 2432 need not necessarily be stored temporarily.

In the program storage section 2440, the content playing program 2442, a replacement rule setting program 2444, and a replacement rule executing program 2446 are stored as the need arises. Each program is read and executed by the controller 2000, thereby realizing each function.

The content playing program 2442 is a program for playing content on the basis of the distribution data 2412 and the playlist 2432. That is, a timetable data is read in accordance with schedule data, and program data is read on the basis of the read timetable data. Content is displayed on the basis of the read program data.

The replacement rule setting program 2444 is a program for setting replacement rule data. In addition, the replacement rule executing program 2446 is a program for outputting the playlist 2432 by applying the replacement rule data 2422 (replacement content 2424) to the distribution data 2412. This processing will be described later.

1.2.3 Shared File Server

Figure 8:
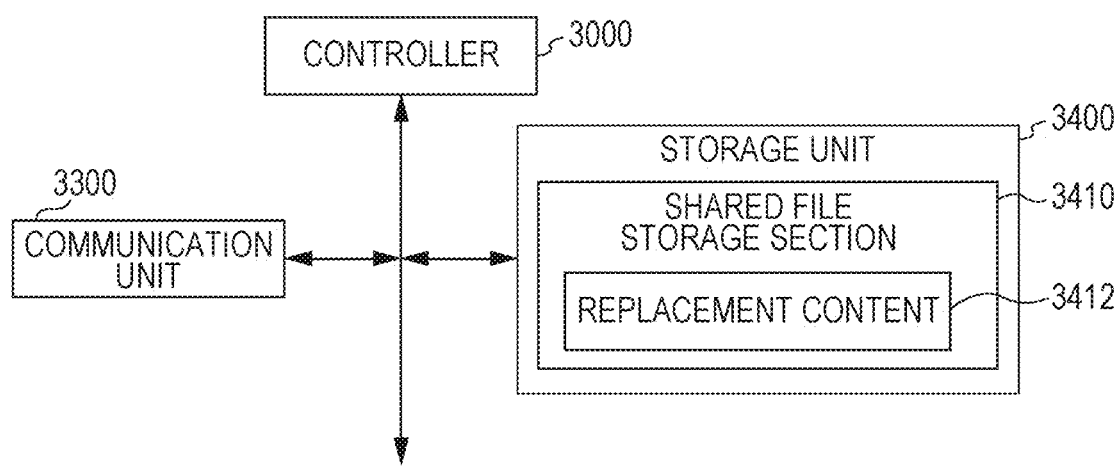
FIG. 8 is a diagram for describing the functional configuration of a shared file server apparatus according to the first embodiment.

The functional configuration of the shared file server 30 according to the present embodiment will be described on the basis of FIG. 8. The functional configuration of the shared file server 30 includes, as illustrated in FIG. 8, a controller 3000, a communication unit 3300, and a storage unit 3400.

The controller 3000 is a function unit for controlling the entire shared file server 30. The controller 3000 realizes various functions by reading and executing various programs stored in the storage unit 3400, and includes, for example, a CPU.

The communication unit 3300 is a function unit for connecting to a network. Examples of the communication unit 3300 include a wired LAN, a wireless LAN, and an interface capable of connecting to LTE networks. When connected to such a network, the communication unit 3300 is connected to another apparatus or network and becomes able to communicate with the other apparatus or network.

The storage unit 3400 is a function unit that stores various programs and various items of data for the operation of the shared file server 30. The storage unit 3400 includes, for example, an SSD which is semiconductor memory, or an HDD which is a magnetic disk. Alternatively, for example, USB memory or a memory card may be used as the storage unit 3400.

In addition, a storage area, namely, a shared file storage section 3410 for storing replacement content 3412 is secured in the storage unit 3400. Replacement content may be stored in a file sharable place, instead of in the display apparatus 20. Although a place where replacement content can be stored is described as the shared file server 30 in the present embodiment, replacement content may be stored in, for example, the terminal apparatus 40, or an area may be provided in the storage unit 2400 of another display apparatus 20.

As the file sharing mechanism, the file sharing mechanism of the related art, which has been described above, may be used, and a detailed description thereof is omitted.

1.3 Flow of Process

Next, the flow of a process according to the present embodiment will be described with reference to the drawings.

1.3.1 Flow of Replacement Rule

At first, the outline of the overall mechanism for replacement using a replacement rule will be described. The content distribution apparatus 10 distributes generated distribution data to the display apparatus 20. In the display apparatus 20, the distribution data distributed from the content distribution apparatus 10 is stored as the distribution data 2412 in the distribution data storage section 2410. The distribution data 2412 is played and displayed by the content playing program 2442.

Here, when replacement content is stored on the display apparatus 20 side, content to be displayed on the basis of the original distribution data is replaced by the replacement content, and the replacement content is displayed. To replace content or a program, a replacement rule is set.

The set replacement rule is stored as replacement rule data in a place (such as a folder) different from that of the distribution data.

Figure 9:
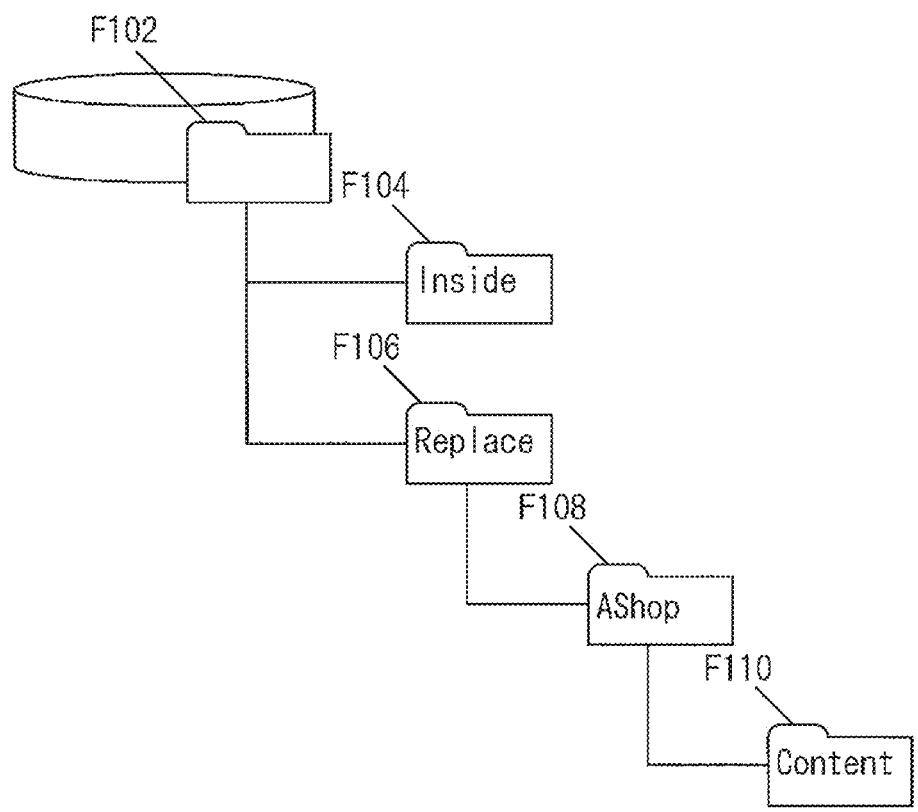
FIG. 9 is a diagram for describing a folder configuration according to the first embodiment.

Here, the folder configuration will be described with reference to FIG. 9. Content to be displayed on the display apparatus 20 is stored in a data folder F102. Here, distribution data received from the content distribution apparatus 10 is stored in a schedule data folder F104 (Inside folder). The content playing program 2442, which is a displaying program, obtains distribution data stored in the folder F104.

Here, when replacement rule data is stored in a replacement rule management folder F106 (Replace folder) stored in a control file (setting file), the replacement rule data is obtained. Here, the replacement rule data is stored in a replacement rule folder F108 (AShop folder). Here, because a plurality of items of replacement rule data can be stored in the folder F106, each item is stored in a child folder; however, these items may be stored in the folder F106.

In accordance with the replacement rule data, a file of replacement content is obtained from a replacement content folder F110 (Content folder). When generating replacement rule data, the replacement rule setting program 2444 copies content (file) from a reference destination folder and stores the content (file) in the replacement content folder F110. The reference destination folder may be in the display apparatus 20 or may be in the shared file storage section 3410.

In accordance with a rule described in the replacement rule data, specified content/program is replaced with replacement content (file) and the replacement file is displayed. At this time, a playlist is generated from the replacement content (file), and the replacement content (file) is displayed.

1.3.2 Replacement Rule Setting Process

Figure 10:
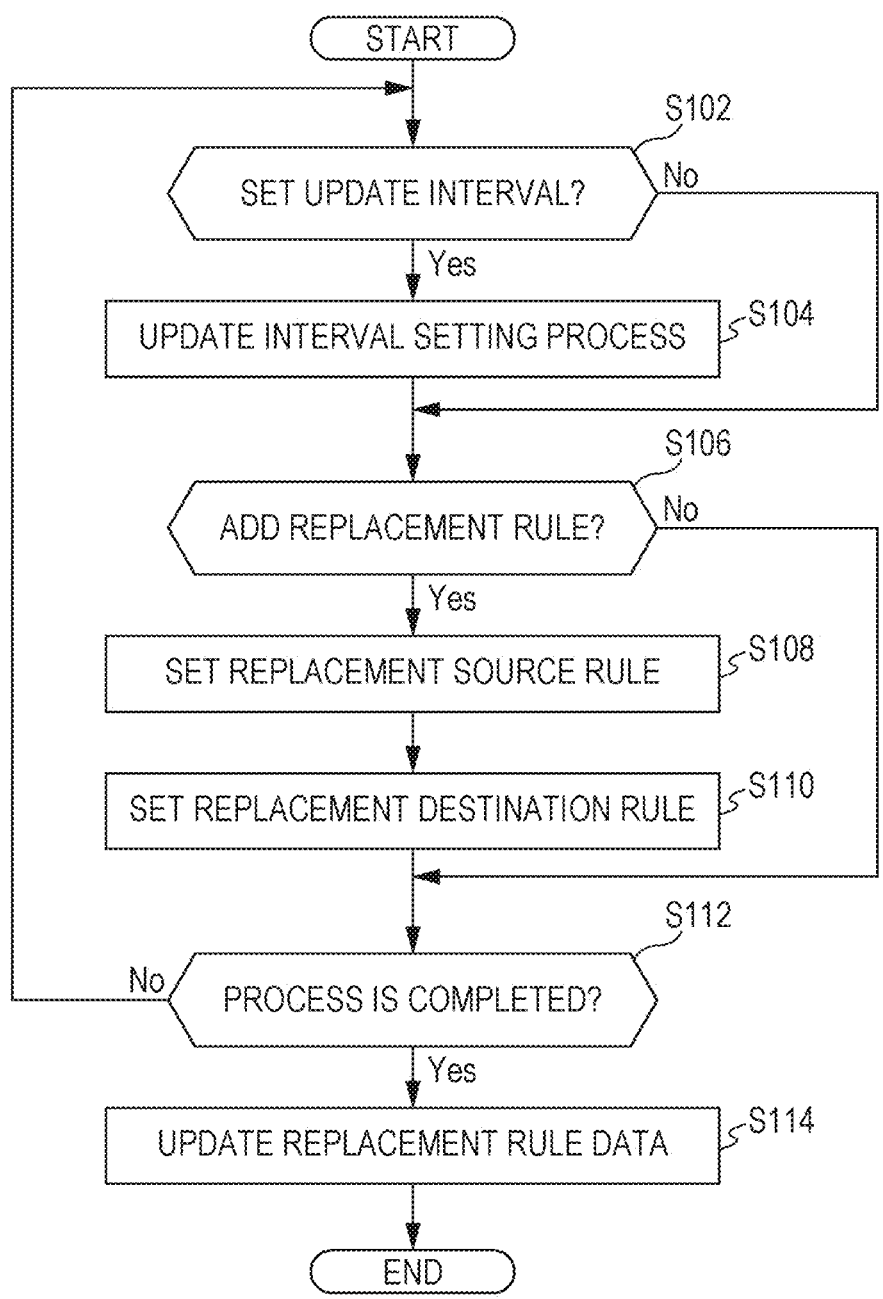
FIG. 10 illustrates an operation flow for describing a replacement rule setting process according to the first embodiment.

A process of actually setting a replacement rule will be described with reference to FIG. 10. At first, when an operation for setting an update interval is performed, an update interval setting process of setting an update interval is executed (from YES in step S102 to step S104). Here, the update interval is the timing to check the reference destination folder, and, if a file in the reference destination folder has been updated, to-be-displayed replacement content is also updated. Although this processing is described as part of the process in the present embodiment, this processing may be executed in another process.

Next, when an operation for adding a replacement rule is performed (YES in step S106), a replacement-source rule (step S108) and a replacement-destination rule are set (step S110). By setting the replacement-source rule and the replacement-destination rule in association with each other, the rules are set as a replacement rule. This processing is repeatedly executed until the process is completed (from NO in step S112 to step S102).

When all replacement rules are added, the replacement rule data is updated (step S114), and the process ends.

Although the process of adding a replacement rule has been described in the above-described flow of the process, needless to say, a process of editing an already-set replacement rule, and a process of deleting a replacement rule are similarly executable.

Figure 11:
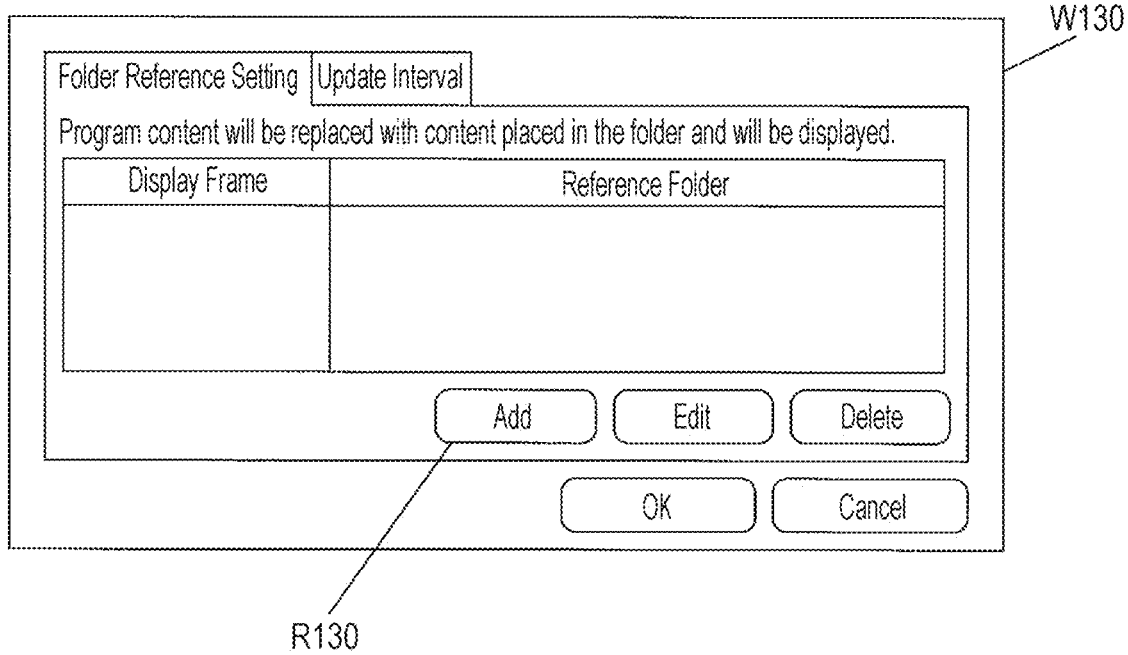
FIG. 11 illustrates an exemplary screen for describing the replacement rule setting process according to the first embodiment.
Figure 12:
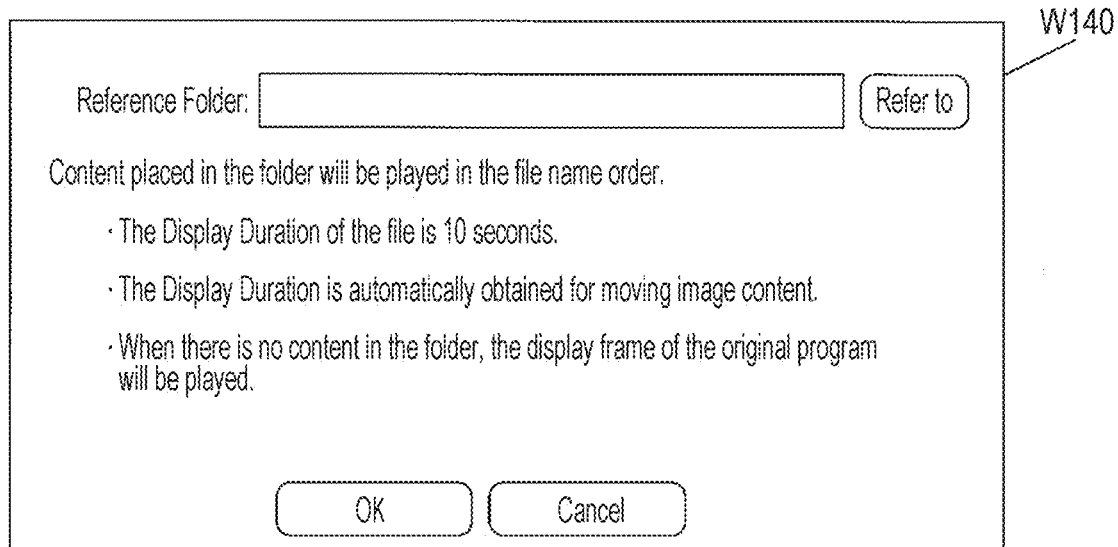
FIG. 12 illustrates an exemplary screen for describing the replacement rule setting process according to the first embodiment.

An exemplary screen in the case of executing the process will be described with reference to FIG. 11. FIG. 11 illustrates an example of a display screen W130 in the case of adding, editing, or deleting a replacement rule. Here, when an adding process is selected by an addition button R130, the display screen W130 is switched to a display screen W140 in FIG. 12.

On the display screen W140, as an example, a reference folder at the replacement destination is selectable. Various items of data, such as files and folders, are selectable as the replacement destination.

This time, it is assumed that a certain program has been selected as the replacement source. As a replacement-source rule, for example, a program or to-be-distributed content (content file) is selectable.

Replacement Rule

Here, representative ones among those that are set as replacement rules will be described.

(1) File Replacement

In distributed distribution data, one file is replaced with another file. For example, the replacement rule is set as follows:

Picture1.jpg→AnotherPicture1.jpg

As a representative example, for example, a company-wide logo can be switched to a store-original logo.

(2) File Replacement (Multiple)

In distributed distribution data, one file is replaced with a plurality of consecutive files. For example, the replacement rule is set as follows:

Picture1.jpg→AnotherPicture1.jpg, AnotherPicture2.jpg (3) File Skipping

In distributed data, one file is skipped, and the data is played. In this case, initial content for replacement may be separately specified, or the display duration of content before and after the content of interest may be adjusted:

Picture1.jpg→

(4) Program Replacement

A program is entirely replaced with a file or files in a specified folder. In this case, the specified folder may be a local folder or a shared folder:

Program1→[C:¥LocalFolder¥Folder1]

Program1→[¥¥NetworkFolder¥Folder1]

(5) Specification of Multiple Conditions

Some replacement rules among the above-described replacement rules may be combined. For example, a replacement rule such as one that replaces a content file only in a certain program may be used.

Program1 and Picture1.jpg→AnotherPicture1.jpg

In the case of the above-described replacement rule, the content file "Picture1.jpg" included in the program "Program1" is replaced.

(Program1 or Program2) and Picture1.jpg→AnotherPicture1.jpg

In the case of the above-described replacement rule, the content file "Picture1.jpg" included in the program "Program1" or "Program2" is replaced.

(6) Conditional Replacement

A replacement rule such as one that applies the above-mentioned conditional replacement rule(s) only in a certain time slot may be used. For example, a replacement rule that normally uses content of distribution data but replaces a program or a file only for a certain time may be used.

Timetable1 & 15:00-15:15→[¥¥NetworkFolder¥Folder1]

In the case of the above-described replacement rule, the program is replaced with content in the shared folder only for 15:00 to 15:15 in TimeTable1.

1.3.3 Content Display

Figure 13:
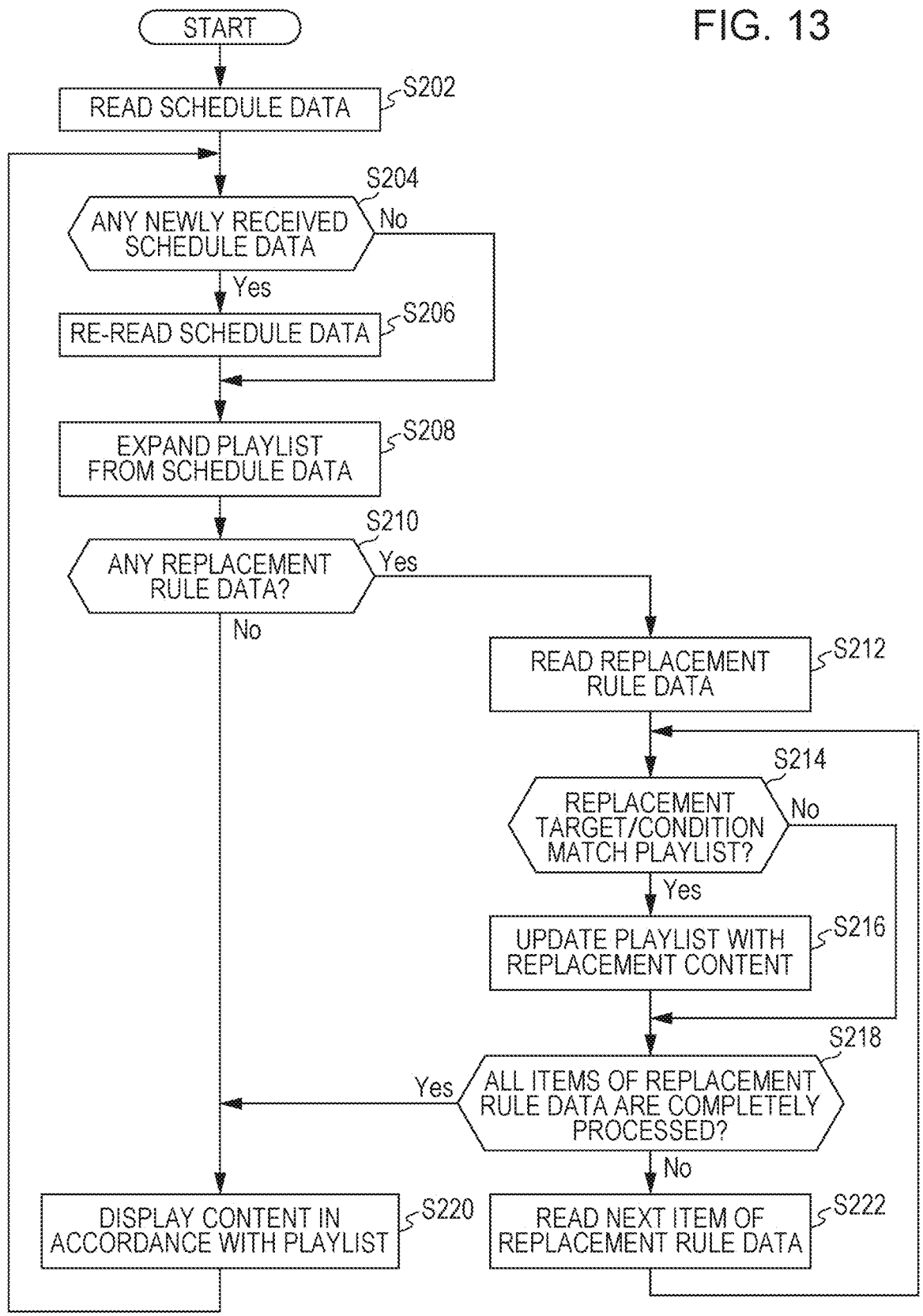
FIG. 13 illustrates an operation flow for describing a process in the case of displaying content according to the first embodiment.

Next, a content displaying process will be described with reference to FIG. 13. The process in FIG. 13 is a process realized by executing the replacement rule executing program 2446 and the content playing program 2442.

At first, schedule data is read (step S202). Here, when there is newly received schedule data, the schedule data is re-read (from YES in step S204 to step S206). Next, a playlist is expanded from the schedule data (step S208). Specifically, the schedule data, timetable data, and program data are expanded. When there is no replacement rule data (NO in step S210), content is displayed in accordance with the playlist (step S220).

Here, when there is replacement rule data (YES in step S210), the replacement rule data is read (step S212). Here, whether or not there is replacement rule data may be determined by determining whether or not there is a control file or whether or not the replacement rule data 2422 is stored.

When the replacement target and condition match the playlist, that is, when there is one in the replacement source data that matches the playlist (YES in step S214), the corresponding portion is replaced with the replacement destination data (replacement content), and the playlist is updated (step S216).

Here, a to-be-replaced target is content or a program corresponding to each element stored in the replacement rule data. Specifically, when the target of the replacement rule is "content", it is determined whether there is content that matches the element "content", and, if there is such content, the content is replaced with the replacement content.

Alternatively, if the target of the replacement rule is not "content" but is "program", comparison is done using a program data name. If there is a program data name that matches the target of the replacement rule, the details of the program are replaced with the replacement content as it is.

When the processing of all items of replacement rule data is completed (YES in step S218), content (content file(s)) is displayed in accordance with the playlist (step S220). If the processing of all items of replacement rule data is not completed (NO in step S218), the next item of replacement rule data is read (step S222), and the processing is repeatedly executed from step S214 onward.

1.4 Exemplary Operation

Next, the flow of an exemplary operation according to the present embodiment will be described with reference to FIGS. 14A and 14B. At first, the case where there is the following replacement rule 1 as a replacement rule will be described:

Replacement Rule 1:

CompanyLogo.jpg→StoreInformation.jpg

Figure 14A:
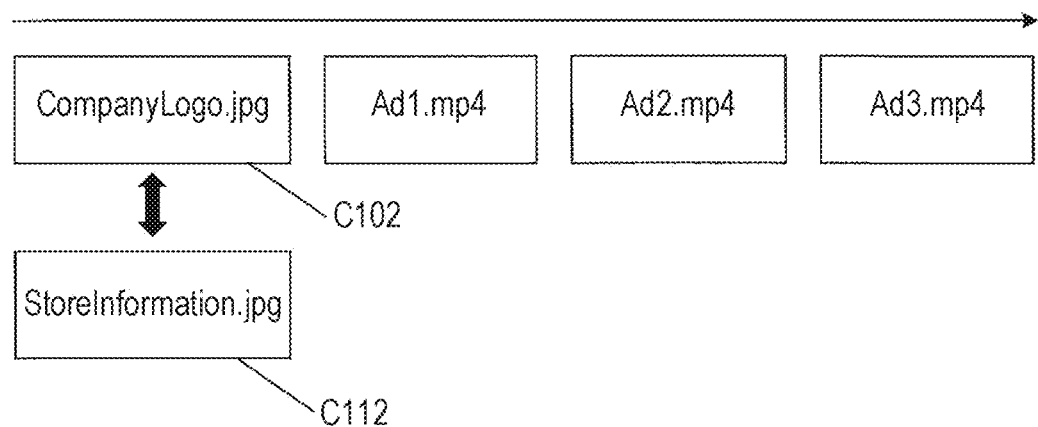
FIGS. 14A and 14B are diagrams for describing a content replacement operation according to the first embodiment.
Figure 14B:
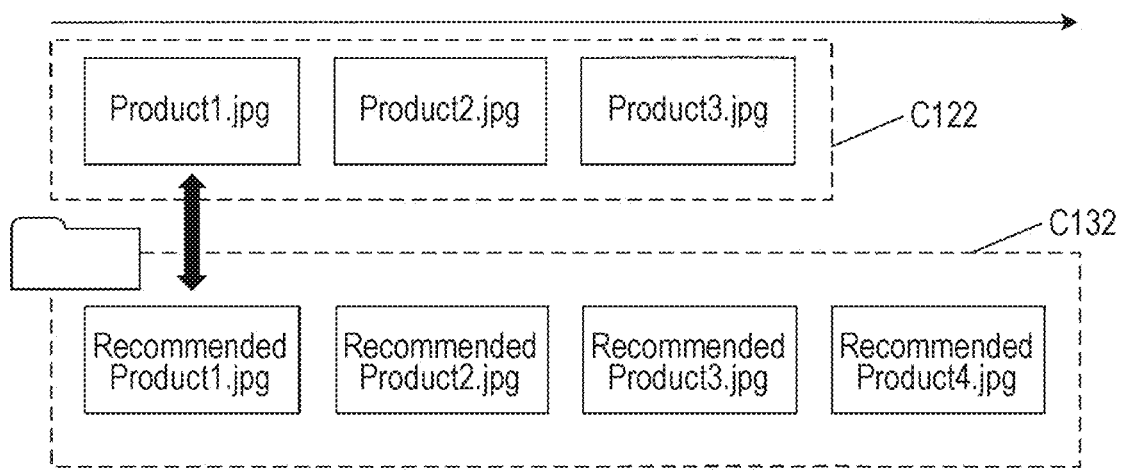

Distribution data distributed from the content distribution apparatus 10 includes, as content, "CompanyLogo.jpg", "Ad1.mp4", "Ad2.mp4", and "Ad3.mp4" (FIG. 14A).

Here, the content in FIG. 14A is replaced according to the above-mentioned replacement rule. That is, content C102 is replaced with content C112, and the playlist becomes as follows:

"StoreInformation.jpg"→"Ad1.mp4"→"Ad2.mp4"→"Ad3.mp4", and the content is displayed.

In addition, the case where there is the following replacement rule 2 will be described:

Replacement Rule 2:

Program1→[¥¥NetworkFolder¥Folder1]

Distribution data distributed from the content distribution apparatus 10 includes, as a program C122, "Product1.jpg", "Product2.jpg", and "Product3.jpg".

Here, as the replacement rule, the place of a shared folder (such as "¥¥NetworkFolder¥Folder1" indicating the place of the shared file server 30) is set in the replacement rule. Thus, the program C122 is replaced such that content included in the program is replaced by content included in the shared folder.

That is, "RecommendedProduct1.jpg", "RecommendedProduct2.jpg", "RecommendedProduct3.jpg", and "RecommendedProduct4.jpg" are included as content C132. When replaced with these items of content, the program itself is replaced.

If there is no replacement content even when there is a replacement rule, content included in the original distribution data may be displayed, or content in the case where there is no replacement content may be displayed.

In this manner, according to the present embodiment, with the use of a replacement rule, a program/content distributed from the content distribution apparatus 10 can be easily replaced with desired content on the display apparatus 20 side.

Because content is stored in a folder different from that of distribution data, the distribution data can be prevented from being destructed by an operation error or the like.

2. SECOND EMBODIMENT

Next, a second embodiment will be described. The second embodiment is an embodiment in the case where, when displaying content (program), content is allocated to a display frame and is displayed. Note that the functional configuration is identical to that in the first embodiment, and differences from the first embodiment will be mainly described.

Figure 15A:
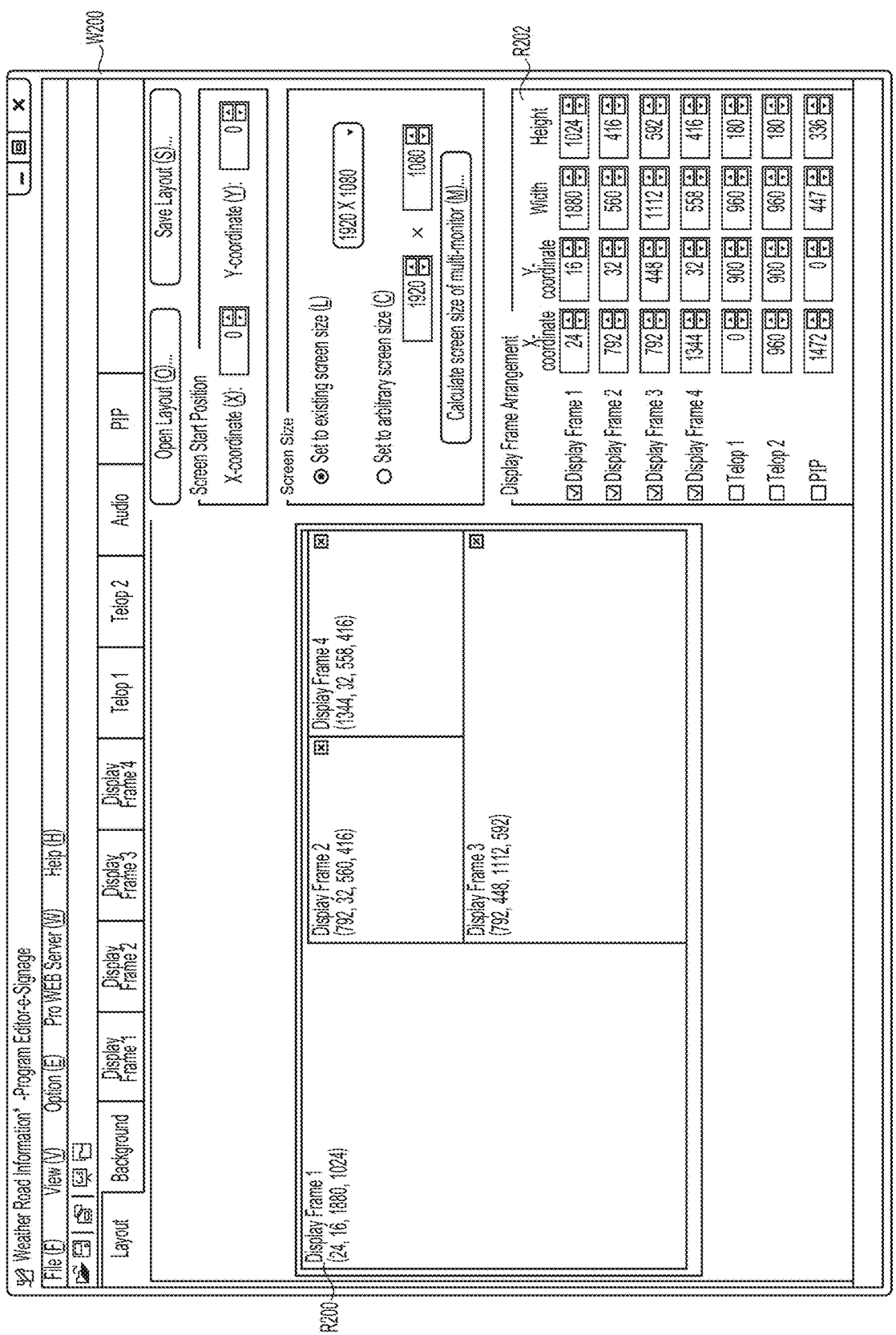
FIG. 15A is a diagram for describing display frame settings according to a second embodiment.

FIG. 15A is a diagram illustrating an example of a screen for setting display frames. Display frames are regions into which a region for display is divided, and corresponding content is played in each display frame. For example, in FIG. 15A, display frames set in a region R200 are displayed, and it is displayed that there are regions that are namely display frame 1, display frame 2, display frame 3, and display frame 4.

In addition, the details of the size of each display frame are set in a region R202. Here, only one display frame may be used, or the region R200 may be divided into two or three display frames and displayed.

Information (attribute) of the display frame(s) may be included in the program data. For example, FIG. 15B illustrates an example of the program data. The program data includes the coordinates of each display frame, and content to be displayed in that display frame.

In the present embodiment, the display frame(s) can be included in a replacement attribute.

Frame1→AnotherPicture1.jpg, AnotherPicture2.jpg

For example, in the case of the above-mentioned replacement rule, content in the display frame 1 (Frame1) is replaced with two image files (AnotherPicture1.jpg, AnotherPicture2.jpg) on the basis of the replacement rule.

Frame1→[C:¥LocalFolder¥Folder1]

In addition, in the case of the above-mentioned replacement rule, content in the display frame 1 (Frame1) is replaced with content stored in the local folder

[C:¥LocalFolder¥Folder1] on the basis of the replacement rule, and a playlist is generated. The content after the replacement based on the replacement rule is displayed/played. As has been described above, needless to say, items of replacement rule data may be combined.

Program1 and Frame1→[¥¥NetworkFolder¥Folder1]

In the case of the above-mentioned replacement rule, the rule replaces the details of Program 1 displayed in the display frame 1 with content in the shared folder.

FIG. 16 illustrates an example of a display screen W210 for setting a replacement rule. As indicated in the display screen W210, in the case of setting a replacement rule, a display frame can be set, as indicated in a region R210. Accordingly, a display frame where content to which a replacement rule is applied is specified, and content such as a program played in the display frame is replaced.

3. THIRD EMBODIMENT

Next, a third embodiment will be described. The third embodiment is an embodiment in the case where a distributed content file is replaced with a replacement content file and the replacement content file is played/displayed by placing the replacement content file in a replacement folder, instead of generating a replacement rule. Note that the functional configuration is identical to that in the first embodiment, and differences from the first embodiment will be mainly described. Because a replacement rule is unnecessary (or set in advance in a program) in the present embodiment, the replacement rule data 2422 need not be stored. In addition, the replacement rule setting program 2444 and the replacement rule executing program 2446 need not be stored. As has been described above, the functional configuration of each apparatus is not an essential element, and, needless to say, may not be provided (not stored) as the need arises depending on each embodiment.

Figure 17:
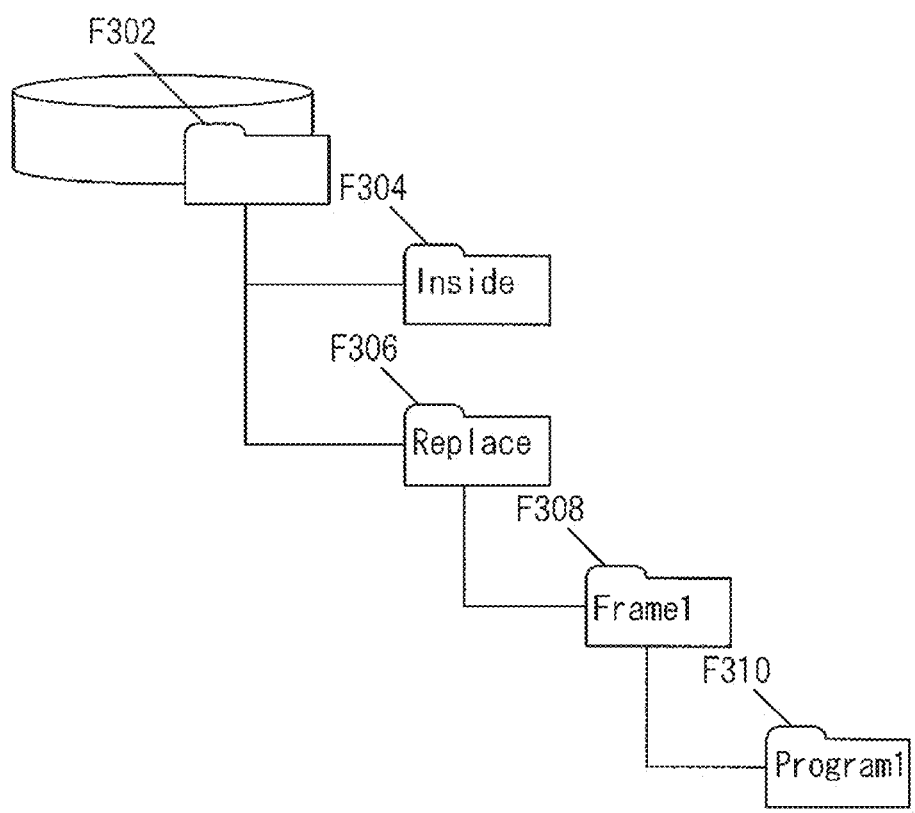
FIG. 17 is a diagram for describing a folder configuration according to a third embodiment.

An example of a folder configuration according to the present embodiment will be described with reference to FIG. 17. In FIG. 17, a content file stored in a folder F302 of the display apparatus 20 is to be displayed.

Here, distribution data distributed from the content distribution apparatus 10 is stored in a folder F304 (Inside folder). The content playing program 2442 displays the content file stored in the folder F304.

Here, when a content file is stored in a replacement folder F306 (Replace folder), the content file stored in the replacement folder F306 is displayed as the need arises.

Specifically, for example, when the folder F306 contains a frame name (Folder F308/Frame1 folder) and a program name (Folder F310/Program1 folder), the program name displayed in this frame is replaced with the details in the folder F310 and the details are displayed.

In addition, the file name of a replaceable content file may be determined in advance. For example, it is assumed that the file name "CM.JPG" is included as the file name of a replaceable content file. In this case, when the user stores another file with the name "CM.JPG" in the folder F306, the distribution data can be easily displayed.

4. FOURTH EMBODIMENT

Next, a fourth embodiment will be described. In the fourth embodiment, the case of setting "rewriting prohibited" (flag) in distribution data when each user is not allowed to replace content without permission will be described. Note that the functional configuration is identical to that in the first embodiment, and differences from the first embodiment will be mainly described.

The content distribution apparatus 10 stores a replacement-prohibited flag in to-be-distributed content. There are several ways to store the flag. For example, a replacement-prohibited flag may be provided in the distribution data 1422, or a replacement-prohibited content list may be separately stored.

Also on the display apparatus 20 side, in the case of replacement-prohibited content, for example, the replacement rule setting program 2444 may be configured not to be able to set a replacement rule, or the content playing program 2442 may be configured to ignore a replacement rule even if there is a replacement rule when playing/displaying content.

Accordingly, for example, important information or an advertisement that is already scheduled to be distributed is not replaceable on the display apparatus 20 side, and content intended by the administrator can be displayed.

5. FIFTH EMBODIMENT

Next, a fifth embodiment will be described. In the fifth embodiment, an embodiment in which, for example, the display duration or the like of content can be set by the file name of replacement content will be described. Note that the functional configuration is identical to that in the first embodiment, and differences from the first embodiment will be mainly described.

Figure 18:
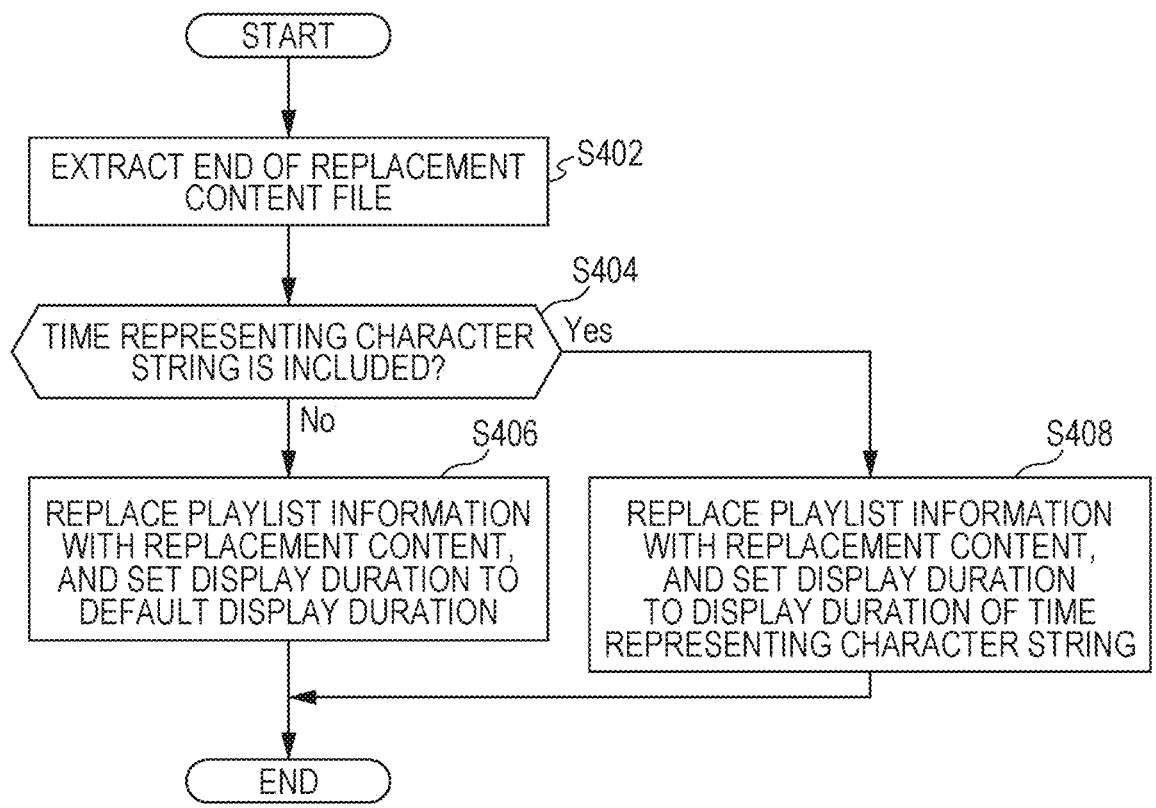
FIG. 18 illustrates an operation flow for describing a process according to a fourth embodiment.

Specifically, in step S216 of FIG. 13, a process illustrated in FIG. 18 is executed when generating a playlist.

At first, the end of the file name of replacement content is extracted (step S402). The display duration of the replacement content can be described at the end of the file name. Therefore, when a time representing character string is not included at the end of the file name of the replacement content (NO in step S404), the playlist information is replaced with the replacement content as usual, and the display duration is set to a default display duration.

Alternatively, when a time representing character string is included at the end of the file name of the replacement content (YES in step S404), the playlist information is replaced with the replacement content, and the display duration is set to a time extracted from the time representing character string (step S408).

For example, in the case of "Picture_15s.jpg", the still image "Picture.jpg" is played for 15 seconds. In the case of "slide_1m30s.ppt", the slide file "slide.ppt" is played/displayed for 1 minute and 30 seconds.

In this case, the default display duration may be set as 10 seconds, for example. In the case of a moving image file, the original display duration may be set as the display duration.

6. SIXTH EMBODIMENT

Next, a sixth embodiment will be described. In the sixth embodiment, an embodiment in which a replacement rule is forced to be reset, or content is forced to be rewritten with new distribution data on the content distribution apparatus 10 side will be described. Note that the functional configuration is identical to that in the first embodiment, and differences from the first embodiment will be mainly described.

There are various ways to restore content that has been replaced at the initiative of the content distribution apparatus 10 side to distribution data. For example, the following operation is conceivable.

(1) Re-Distribution of Distribution Data

The content distribution apparatus 10 transmits distribution data again to the display apparatus 20 as the need arises. On receipt of the distribution data, the display apparatus 20 generates again a playlist on the basis of the received distribution data, although there is the playlist 2432. At this time, when there is distribution data newer than a replacement rule generated by the replacement rule setting program 2444, the content playing program 2442 is configured to play/display the distribution content, not the replacement content.

(2) Distribution of Replacement List

Although a replacement list is generated on the display apparatus 20 side in the above-described embodiments, a replacement list may be generated on the content distribution apparatus 10 side and may be distributed to the display apparatus 20.

For example, when the content distribution apparatus 10 sets the following replacement rule:

Frame1→[¥¥Mainserver¥Folder1]

the content "Frame1" is forced to be replaced with the details in the shared folder.

In addition, when the following replacement rule is set and is periodically distributed:

CM1.jpg→CM1.jpg even if the display apparatus 20 sets the following replacement rule:

CM1.jpg→ETC1.jpg the replacement rule is forced to be rewritten. Accordingly, for the display apparatus 20, the content "CM1.jpg" becomes content that is not replaceable.

7. MODIFICATIONS

Although the embodiments have been described in detail with reference to the drawings, the specific configurations are not limited to the embodiments, and designs and the like without departing from the scope of the gist of the disclosure are also included in the scope of claims.

A program running on each apparatus according to the embodiments is a program controlling a CPU or the like to realize the functions of the above-described embodiments (a program causing a computer to function as the functions of the embodiments). Information handled by these apparatuses is temporarily accumulated during the processing in a temporary storage device (such as random-access memory (RAM)), and then the information is stored in a storage device such as various types of ROM or a hard disk drive (HDD) and, as the need arises, read, modified, and written by the CPU.

To distribute the program in the market, the program can be stored in a portable recording medium and distributed or transferred to a server computer connected via a network such as the Internet. In this case, needless to say, a storage device of the server computer is also included in the present disclosure.

The present disclosure contains subject matter related to that disclosed in Japanese Priority Patent Application JP 2017-060711 filed in the Japan Patent Office on Mar. 27, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus that displays content, the display apparatus comprising:
a controller that receives a distribution data including a display schedule and content from a content distribution apparatus, and
a storage that stores the distribution data, wherein
when the controller displays the content based on the display schedule, the controller:
displays a replacement content based on a display duration indicated by an attribute regarding the display duration if the replacement content is stored in a specific folder of the storage and the replacement content has the attribute regarding the display duration, and
displays the replacement content based on a display duration determined by information regarding the display duration if the replacement content does not have an attribute regarding the display duration and information regarding the display duration is included in a file name of the replacement content.

2. The display apparatus according to claim 1, wherein:
the controller determines whether a frame name folder and a program name folder are included in the specified folder or not,
when the frame name folder and the program name folder are included in the specified folder, the controller replaces content to be displayed on a frame with the replacement content stored in the program name folder and displays the replacement content.

3. The display apparatus according to claim 1, wherein:
when a file name of the content distributed from the content distribution apparatus is the same as a file name of the replacement content stored in the specified folder, the controller replaces the content distributed from the content distribution apparatus with the replacement content stored in the specified folder and displays the replacement content.

4. The display apparatus according to claim 1, wherein:
when the replacement content does not have an attribute regarding the display duration, the controller receives a setting of a time representing character string regarding the display duration as a file name of the replacement content.

5. The display apparatus according to claim 1, wherein:
when there are a plurality of replacement content stored in the specified folder, the controller displays the plurality of replacement content in order of file name.

6. The display apparatus according to claim 1, wherein:
when the replacement content is not stored in the specific folder of the storage, the controller displays the content distributed from the content distribution apparatus.

7. A non-transitory recording medium storing a program for causing a computer mounted on a display apparatus to execute a process comprising:
receiving a distribution data including a display schedule and content from a content distribution apparatus,
storing the distribution data,
displaying the content based on the display schedule,
displaying a replacement content based on a display duration indicated by an attribute regarding the display duration if the replacement content is stored in a specific folder of the storage and the replacement content has the attribute regarding the display duration, and
displaying the replacement content based on a display duration determined by information regarding the display duration if the replacement content does not have an attribute regarding the display duration and information regarding the display duration is included in a file name of the replacement content.

\* \* \* \* \*